United States Patent [19]

Lee

[11] 3,811,008

[45] May 14, 1974

[54] VIDEO MULTIPLEX SYSTEM

[76] Inventor: Saishek Lee, 3322 Beauchamp, Houston, Tex. 77009

[22] Filed: Jan. 24, 1972

[21] Appl. No.: 220,019

[52] U.S. Cl. .......................... 178/6.6 A, 178/DIG. 23

[51] Int. Cl. .......................... H04n 5/78

[58] Field of Search .............178/DIG. 1, DIG. 23, 178/DIG. 38, 6.6 R, 6.6 A

[56] References Cited

UNITED STATES PATENTS

| | | | |
|---|---|---|---|
| 2,527,967 | 10/1950 | Schrader | 178/DIG. 23 |
| 3,580,998 | 5/1971 | Hammond | 178/DIG. 1 |
| 3,686,434 | 8/1972 | Lemelsom | 178/6.6 A |
| 3,686,436 | 8/1972 | Camras | 178/DIG. 23 |
| 2,976,354 | 3/1961 | Banning et al. | 178/6.6 A |
| 3,401,231 | 9/1968 | Baldwin | 178/6.6 A |
| 3,472,949 | 10/1969 | Banning et al. | 178/6.6 A |

*Primary Examiner*—Raymond F. Cardillo, Jr.

*Attorney, Agent, or Firm*—Finnegan, Henderson, Farabow & Garrett

[57] ABSTRACT

A video multiplex system for recording video signals from a plurality of video channels and reproducing the video signals on a plurality of video monitors is provided. The system includes a video recorder, multiplex circuitry for sequentially coupling a video input of the recorder to the video channels, demultiplex circuitry for sequentially connecting a video output of the recorder to the monitors, and a control circuit responsive to synchronizing signals from at least one of the video channels for operating the multiplex and demultiplex circuitry. The system also includes a signal generator operated by a control circuit for applying a synchronzing signal to an audio input of the recorder during the coupling of a selected video channel to the recorder to indentify video signals recorded from the selected channel. A synchronizing signal detector responsive to an audio output of the recorder is provided to synchronize the operation of the control circuit and demultiplex circuitry with the recorded video signals during play-back of the recorded video signal on the monitors.

5 Claims, 7 Drawing Figures

VIDEO MULTIPLEX SYSTEM

The present invention relates to a video multiplex system for recording video signals from a plurality of video channels and, more particularly, to a video multiplex system including a video tape recorder for recording video signals from a plurality of video cameras and reproducing the video signals on a plurality of video monitors by time multiplexing technique.

In a time multiplex system for recording and reproducing video signals from a plurality of video channels, video signals are recorded by sequentially coupling the channels to a video recorder through a multiplex switch, and the signals are thereafter reproduced by sequentially coupling the recorder to a plurality of video monitors through a demultiplex switch. It is necessary to provide for channel synchronization in the operation of the system to insure that video signals recorded from the video channels are consistently reproduced on the corresponding video monitors. Thus, in recording the video signals on a recording medium, such as a video tape, it is important to preserve the identity of the video channels from which the signals are derived so that, in reproducing the recorded video signals from the recording medium, the video signals can be applied to the corresponding video monitors to provide for accurate play-back of the signals. The system thus requires a circuit which provides for identification of the video signals applied to the recorder by the multiplex switch and maintains synchronism between the recorded video signals and the operation of the demultiplex switch.

The present invention provides a system for recording and reproducing video signals from a plurality of video channels in which channel synchronization is achieved by recording synchronizing signals on the recording medium of a video recorder during the time periods that a selected video channel is coupled to the recorder by a multiplex switching circuit. The recorded synchronizing signals identify the video signals recorded from the selected video channel. During playback of the video signals, the recorded synchronizing signals are employed to synchronize a demultiplex switching circuit of the system with the recorded video signals. The system includes a common control circuit for operating both the multiplex and demultiplex switching circuitry.

In accordance with the present invention, a multiplex system for recording video signals from a plurality of video channels on a video recorder comprises a multiplex switch for sequentially coupling the video recorder to each video channel, a signal generator for applying a synchronizing signal to the video recorder during the coupling of a selected video channel to the video recorder, and control means including a counting circuit responsive to synchronizing signals from at least one of the video channels for operating the multiplex switch and actuating the signal generator to sequentially couple the video recorder to each video channel and to apply a synchronizing signal to the video recorder during the coupling of the selected video channel to the video recorder. A preferred embodiment of the control means comprises a pulse generator responsive to vertical blanking signals from at least one of the video channels for producing pulses during the vertical blanking periods of the video signals and a counting circuit responsive to the pulses for operating the multiplex switch during the vertical blanking periods of the video signals to sequentially couple the recorder to the video channels.

In accordance with a preferred embodiment of the present invention, a video multiplex system for recording and reproducing video signals comprises a video tape recorder having video and audio inputs and video and audio outputs, a plurality of video cameras, a plurality of video monitors, a multiplex switch for sequentially connecting the video cameras to the video input of the video tape recorder, a demultiplex switch for sequentially connecting the video monitors to the video output of the video tape recorder, a signal generator for applying a synchronizing signal to the audio input of the video tape recorder during the coupling of a selected video camera to the video input, a pulse genrator responsive to vertical blanking signals from at least one of the video cameras during recording of the video signals and responsive to the video output of the recorder during play-back of the recorded video signals for producing pulses during the vertical blanking periods of the video signals, a counting circuit responsive to the pulses for simultaneously operating the multiplex and demultiplex switches and for actuating the signal generator to apply a synchronizing signal to the audio input of the recorder during the coupling of the selected video camera to the video input, a synchronizing signal detector responsive to the signal generator during recording of the video signals and responsive to the audio output of the recorder during play-back of the recorded signals for applying the synchronizing signals to the counting circuit, and switching means for connecting the pulse generator to the selected video camera and the synchronizing signal detector to the signal generator during recording of video signals by the recorder and for connecting the pulse generator to the video output of the recorder and the detector to the audio output of the recorder during play-back of the recorded video signals on the video monitors.

The pulse generator and counting circuit provide a common control for operating both the multiplex and demultiplex switches in the preferred embodiment of the multiplex system. The operation of the counting circuit is preferably adjustable to facilitate operation of the multiplex system with a variable number of video channels and monitors.

The accompanying drawings illustrate the preferred embodiment of the present invention and, together with description, serve to explain the principles of the invention.

Of the drawing:

FIG. 1 is a block diagram of a video multiplex system constructed in accordance with the principles of the invention and including a video recorder, a multiplex switch for sequentially connecting a plurality of video cameras to the recorder, a demultiplex switch for sequentially connecting a plurality of video monitors to the recorder, and a control circuit responsive to signals from at least one of the video cameras for operating the multiplex and demultiplex switches;

Figure 1:
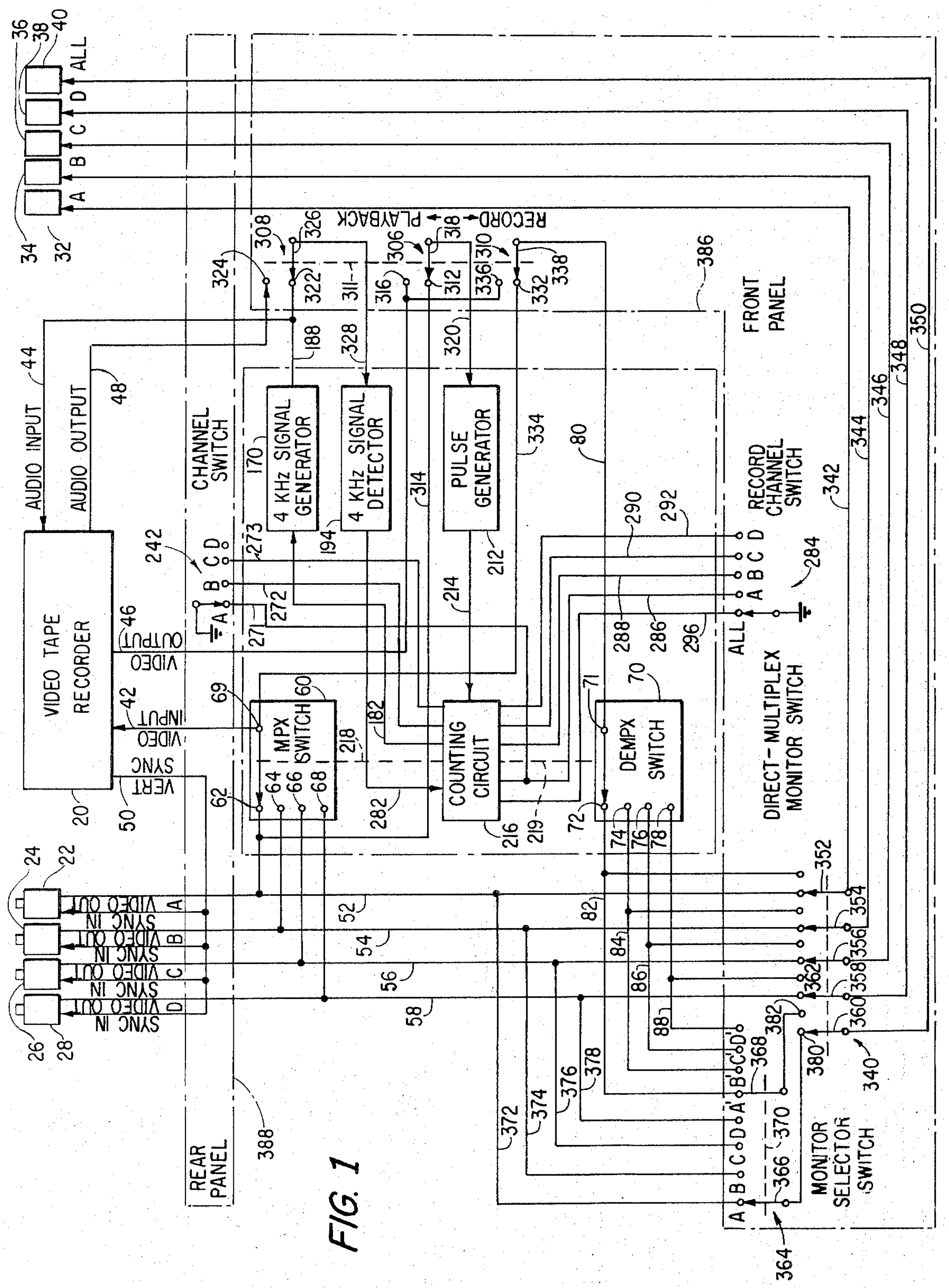

Referring to FIG. 1, a preferred embodiment of the multiplex system of the present invention is provided with a video tape recorder 20 for recording video signals from a plurality of video cameras 22, 24, 26 and 28 and for reproducing the video signals on a plurality of video monitors 32, 34, 36, 38 and 40. Video tape recorder 20 includes video and audio inputs 42 and 44, respectively, and video and audio outputs 46 and 48, respectively. In addition, the video tape recorder includes a vertical sync output 50 to provide vertical synchronizing signals for operating video cameras 22, 24, 26 and 28.

As shown in FIG. 1, the vertical synchronizing signals appearing at vertical sync output 50 of the recorder is applied to video cameras 22, 24, 26 and 28 to operate the cameras in synchronism. The video signals produced by cameras 22, 24, 26 and 28 are applied to output lines 52, 54, 56 and 58, respectively. The output lines are also designated as video channels A, B, C and D for purposes of the following description of the preferred embodiment.

In accordance with the invention, the system incorporates multiplex switching means for sequentially coupling said video recorder to each video channel. As embodied and shown in FIG. 1, the multiplex switching means comprises a multiplex switch 60 having a set of input terminals 62, 64, 66 and 68 connected by a plurality of conductors to output lines 52, 54, 56 and 58, respectively, of the video cameras. In addition, the multiplex switch includes an output terminal 69 connected to video input 42 of the video recorder. In operation, the multiplex switch connects video channels A, B, C and D in sequence, to the video input of recorder 20.

The video multiplex system further includes demultiplex switching means for sequentially connecting the video monitors to the video output of the recorder. As embodied and shown in FIG. 1, a demultiplex switch 70 is provided having an input terminal 71 and a set of output terminals 72, 74, 76 and 78. Input terminal 71 of the demultiplex switch is connected to a conductor 80 and output terminals 72, 74, 76 and 78 are connected to a plurality of conductors 82, 84, 86 and 88, respectively.

Figure 2:
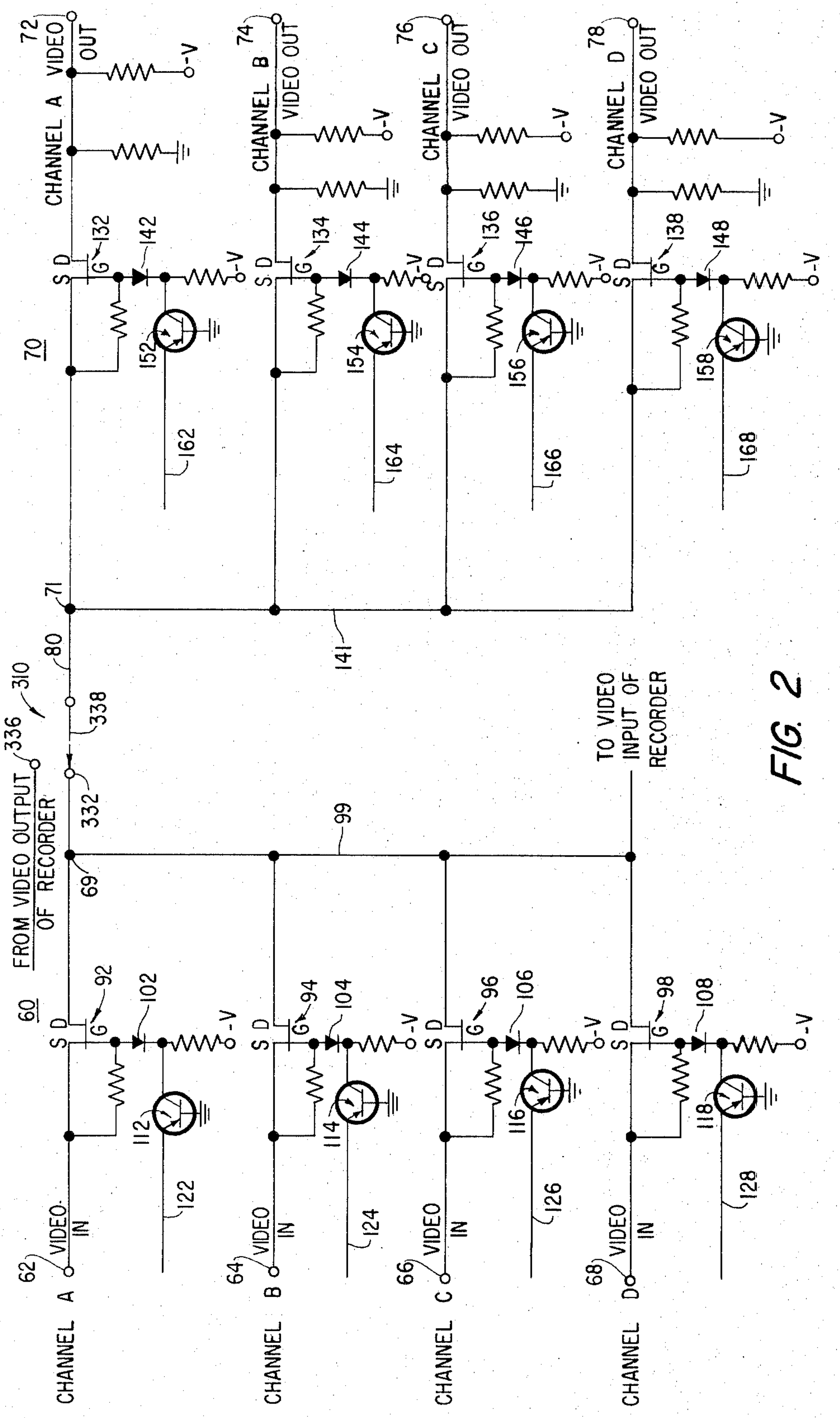
FIG. 2 is a schematic diagram illustrating the components of the multiplex and demultiplex switches of FIG. 1 in detail.

Referring to FIG. 2, the components of the multiplex and demultiplex switches are shown in detail. Multiplex switch 60 comprises a plurality of switching elements, i.e., field effect transistors 92, 94, 96 and 98, connected in parallel between its input terminals 62, 64, 66 and 68 and output terminal 69. Each field effect transistor includes a source electrode S, a drain electrode D, and a gate electrode G. Source electrodes S of transistors 92, 94, 96 and 98 are connected to input terminals 62, 64, 66 and 68, respectively, while drain electrodes D are connected to output terminal 69 by a common conductor 99. Gate electrodes G of transistors 92, 94, 96 and 98 are connected through diodes 102, 104, 106 and 108 to the collector electrodes of transistors 112, 114, 116 and 118, respectively, and through appropriate biasing resistances to a source of potential (−V) to normally bias the field effect transistors into non-conducting states. The base electrodes of transistors 112, 114, 116 and 118 are connected to ground, and the emitter electrodes are connected to conductors 122, 124, 126 and 128, respectively, for applying operating signals to the transistors.

Similarly, demultiplex switch 70 comprises a plurality of switching elements, i.e., field effect transistors 132, 134, 136 and 138, connected in parallel between its input terminal 71 and output terminals 72, 74, 76 and 78. Each field effect transistor includes a source electrode S, a drain electrode D, and a gate electrode G. As shown in FIG. 2, source electrodes S of transistors 132, 134, 136 and 138 are connected by a common conductor 141 to input terminal 71 of the demultiplex switch, while drain electrodes D of the transistors are connected to output terminals 72, 74, 76 and 78, respectively. Gate electrodes G of transistors 132, 134, 136 and 138 are connected by diodes 142, 144, 146 and 148 to the base electrodes of transistors 152, 154, 156 and 158, respectively, and through appropriate biasing resistances to a source of potential (−V) to normally bias the field effect transistors into non-conducting states. The base electrodes of transistors 152, 154, 156 and 158 are connected to ground, and the emitter electrodes are connected to conductors 162, 164, 166 and 168, respectively, for applying operating signals to the transistors.

Further, the system of the present invention includes a signal generator for applying a synchronizing signal to the video recorder during the coupling of a selected video channel to the video recorder. As shown in FIG. 1, a signal generator 170 is provided in the system of the preferred embodiment for producing a 4 KHZ signal during the time period that multiplex switch 60 is connected to a selected video channel, e.g., channel A. The function of signal generator 170 is to generate a synchronizing signal in the form of a 4 KHZ square wave for a specified duration upon actuation by an external signal.

Figures 3, 4, 7:
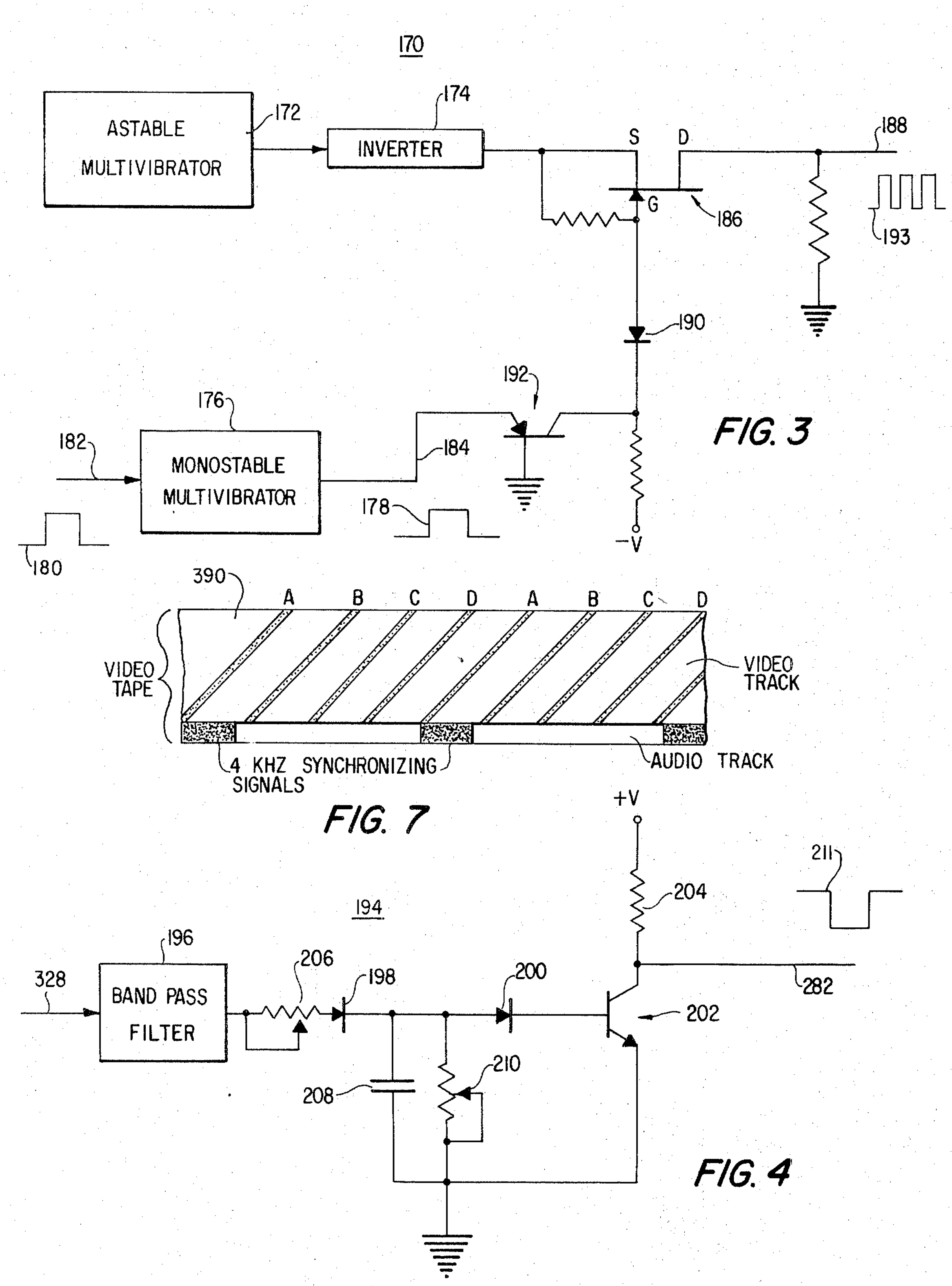
FIG. 3 illustrates a signal generator incorporated in the multiplex system of FIG. 1 for producing a synchronizing signal to identify video signals from a specified video camera.
FIG. 4 illustrates a synchronizing signal detector employed in the multiplex system of FIG. 1 for detecting synchronizing signals recorded by the video recorder.
FIG. 7 illustrates the format used in the multiplex system for recording video signals and synchronizing signals on a video tape.

Referring to FIG. 3, signal generator 170 comprises a conventional astable multivibrator 172, which operates at a frequency of 4 KHZ. The output of astable multivibrator 172 is applied to an inverter 174. The signal generator also includes a conventional monostable multivibrator 176 for producing an output pulse 178 (waveform 178) having a specified duration, e.g., 5 micro-seconds. Monostable multivibrator 176 is actuated by input pulses (waveform 180) applied to a conductor 182 and its output pulses 178 are applied to a conductor 184.

In the signal generator (FIG. 3), a field effect transistor 186 is provided which functions as a gate. A source electrode S of field effect transistor 186 is connected to the output of inverter 174, and a drain electrode D of the field effect transistor is connected to an output conductor 188. A gate electrode G of the field effect transistor is connected by a diode 190 to the collector electrode of a transistor 192 and through an appropriate biasing resistance to a source of potential (−V) to normally bias the field effect transistor into a non-conducting state. The emitter electrode of transistor 192 is connected to the output of monostable multivibrator 176 by conductor 184 and its base electrode is connected to ground. In operation, input pulse 180 actuates monostable multivibrator 176 to produce output pulse 178. The positive voltage transition of output pulse 178 drive transistor 192 into conduction to turn on field effect transistor 186 to gate the 4 KHZ output signal of astable multivibrator 172 to output conductor 188. The resulting output signal is a burst of 4 KHZ square waves (waveform 193) having a duration equal to the duration of pulse 178, i.e., 5 micro-seconds.

Referring to FIG. 1, the system of the preferred embodiment also includes a synchronizing signal detector 194 for detecting the presence of a 4 KHZ and producing an output pulse to indicate detection of the synchronizing signal. As shown in FIG. 4, the synchronizing signal detector of the preferred embodiment comprises a band pass filter 196 having a center frequency of 4 KHZ and an attenuation of 12 db per octave. The output of band pass filter 196 is applied to a half-wave rectifier circuit including diodes 198 and 200. The half-wave rectified output of diode 200 is applied to the base electrode of a transistor 202. The collector electrode of transistor 202 is connected to a source of potential (+V) through a biasing resistance 204 and its emitter electrode is connected to ground. The rectifier circuit also includes a first variable resistance 206 and a shunt capacitor 208 which constitute an RC timing circuit to provide a time delay in the turn-on operation of transistor 202. The purpose of the turn-on delay is to increase the immunity of the detector to noise. A second variable resistance 210 is connected in parallel with capacitance 208 to provide a discharge path for the capacitance. In operation, a burst 4 KHZ square waves applied to band pass filter 196 results in a positive pulse at the base of transistor 202 to turn on the transistor and produce a negative output pulse (waveform 211) at its collector.

The system of the present invention further includes a control means responsive to synchronizing signals from at least one of the video channels for operating the multiplex switching means and actuating the signal generator to sequentially couple the video recorder to each video channel and to apply a synchronizing signal to the video recorder during the coupling of the selected video channel to the video recorder. In the preferred embodiment, the control means comprises a pulse generator responsive to vertical blanking signals from at least one of the video channels for producing pulses during the vertical blanking periods of the video signals and a counting circuit responsive to the pulses for operating the multiplex switching means during the vertical blanking periods of the video signals to connect the video channels in sequence to the video recorder.

As embodied and shown in FIG. 1, the control circuit of the preferred embodiment includes a pulse generator 212 for producing output pulses in response to applied vertical blanking signals. Pulse generator 212 is connected by a conductor 214 to a counting circuit 216 operatively coupled to multiplex switch 60 and demultiplex switch 70 (as indicated by phantom lines 218 and 219). The pulse generator is also connected to signal generator 170 by conductor 182.

Figure 5:
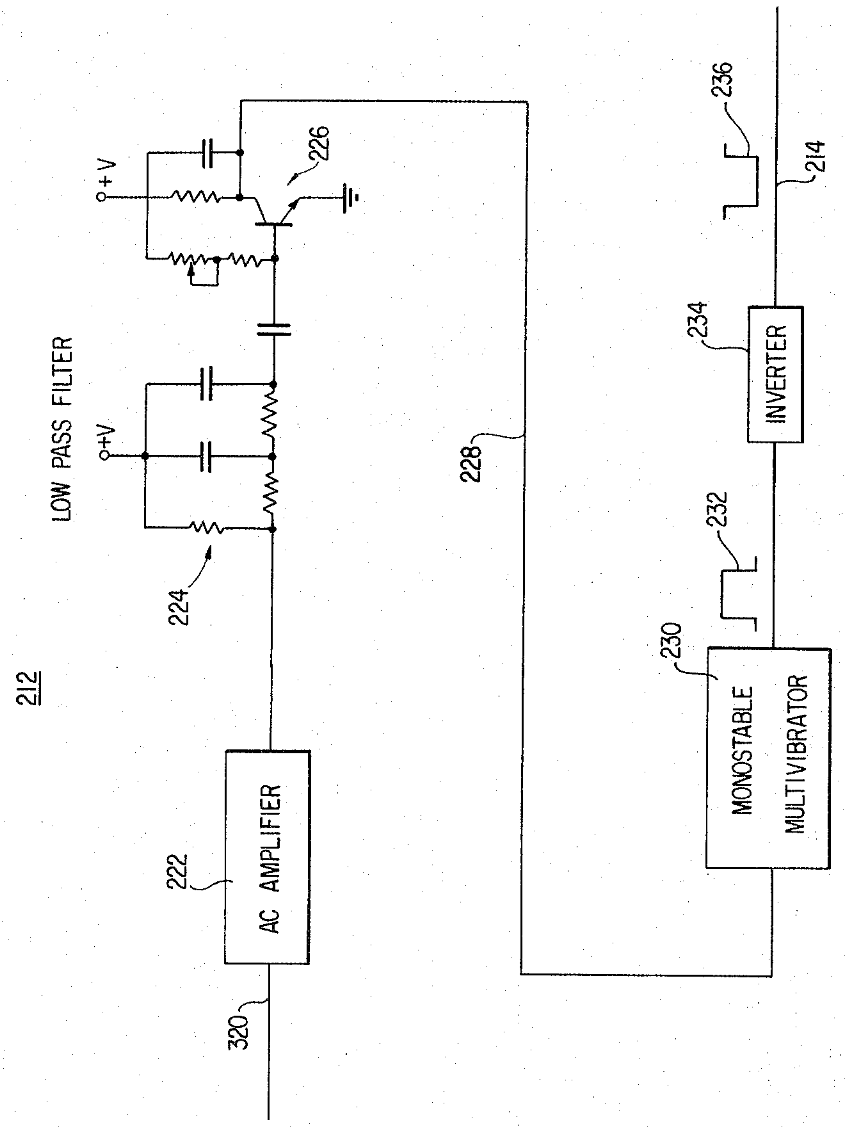
FIG. 5 illustrates a pulse generator incorporated in a preferred embodiment of the control circuit of FIG. 1.

Referring to FIG. 5, pulse generator 212 comprises an AC amplifier 222 and a low pass RC filter network 224 for filtering horizontal sync signals and other unwanted pulses from the output of the AC amplifier. The signal produced by low pass filter network 224 is applied to the base electrode of a transistor 226 which, with proper bias adjustment, is turned off during the vertical blanking time of video signals applied to AC amplifier 222. The collector electrode of transistor 226 is connected by a conductor 228 to the input of a monostable multivibrator 230, and its emitter electrode is connected to ground. Monostable multivibrator 230 produces a positive output pulse (waveform 232) having a duration of 5 micro-seconds when transistor 226 is turned off. This positive output pulse is applied to an inverter 234 to produce a negative output pulse (waveform 236) having the same duration. The negative output pulse of inverter 234 is applied to conductor 214 to operate counting circuit 216 (FIG. 1).

In accordance with the preferred embodiment, the counting circuit includes a binary counter comprising a plurality of binary counting stages operable in a predetermined counting sequence and a plurality of control gates operable by the binary counting stages for actuating the switching elements of the multiplex switching means to connect the video channels in sequence to the video recorder. As shown and embodied in FIG. 6, counting circuit 216 includes a binary counter 237 comprising a pair of flip-flops 238 and 240 which are connected in a divide-by-four configuration. A channel switch 242 (shown schematically in FIG. 6) and gating circuitry 244 provide selective control of the counting circuit for divide-by-one, divide-by-two, divide-by-three, or divide-by-four operations. The operation of channel switch 242 and associated gating circuitry 244 is explained below in detail.

Figure 6:
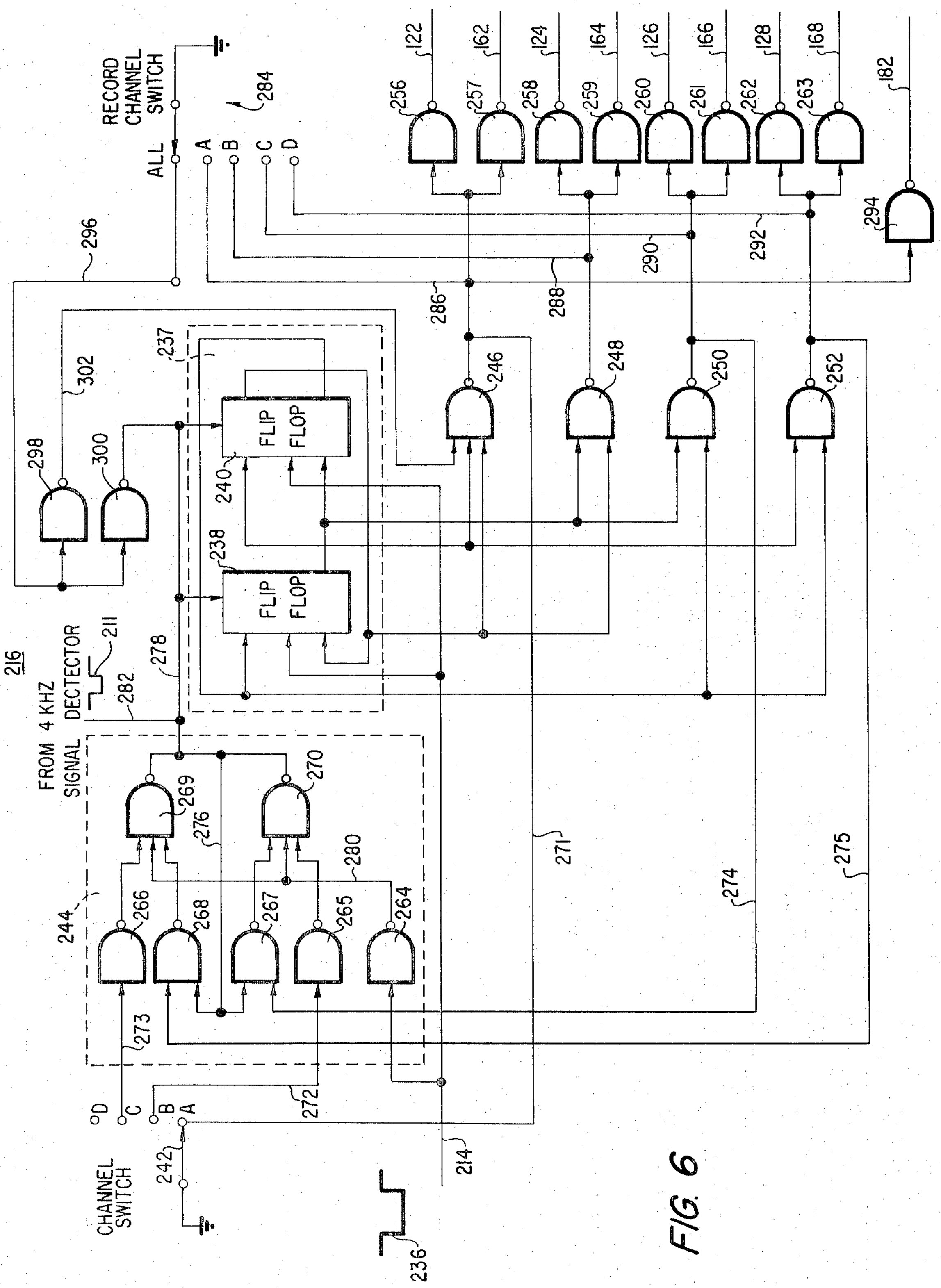
FIG. 6 illustrates a counting circuit incorporated in a preferred embodiment of the control circuit of FIG. 1 for operating the multiplex and multiplex switches of FIG. 2.

As shown in FIG. 6, conductor 214 is connected to clock input terminals of flip-flops 238 and 240 of binary counter 237. The binary counter is advanced by the negative voltage transition of output pulse 236 (FIGS. 5 and 6) applied to conductor 214 by pulse generator 212.

Referring to FIG. 6, the control gates of the counting circuit comprise a set of four NAND gates 246, 248, 250 and 252. This set of NAND gates is connected to output terminals of flip-flops 238 and 240 for actuation in sequence by the counting states appearing in the binary counter. In addition, the gating circuit includes a plurality of inverters 256–263, inclusive. The input terminals of inverters 256 and 257 are connected to the output terminal of NAND gate 246, and the output terminals of the inverters are connected to conductors 122 and 162, respectively. Similarly, the input terminals of inverters 258 and 259 are connected to the output terminal of NAND gate 248, and the output terminals of the inverters are connected to conductors 124 and 164, respectively. In addition, inverters 260 and 261 are similarly connected to NAND gate 250 and conductors 126 and 166, respectively, and inverters 262 and 263 are similarly connected to NAND gate 252 and conductors 128 and 168, respectively.

When binary counter 237, i.e., flip-flops 238 and 240, is operated in its divide-by-four configuration, NAND gates 246, 248, 250 and 252 are actuated in sequence to operate inverters 256–263, inclusive. For example, when NAND gate 246 is actuated to produce a low voltage (binary 0) output signal, inverters 256 and 257 produce high voltage (binary 1) output signals on conductors 122 and 162, which turn on transistors 112 and 152 of multiplex switch 60 and demultiplex switch 70 (FIG. 2). When transistor 122 is turned on, field effect transistor 92 of the multiplex switch is biased into conduction to allow video signals applied to terminal 62 to pass to output terminal 69 of the video multiplex switch. Similary, when transistor 152 of the demultiplex switch is turned on, field effect transistor 132 is biased into conduction to permit video signals applied to input terminal 71 of the demultiplex switch to pass to output terminal 72. The operation of the remaining field effect transistors of the multiplex and demultiplex switches is similarly controlled by NAND gates 248, 250 and 252 and inverters 258–263, inclusive, of the counting circuit (FIG. 6).

In the preferred embodiment, the channel switch and its associated gating circuitry constitute means for selectively varying the counting sequence of the binary counting stages to adjust the system to record video signals from a variable number of video channels. Referring to FIGS. 1 and 6, channel switch 242 includes four (4) switch contacts (designated A, B, C and D) which can be selectively connected to ground. Gating circuitry 244 (FIG. 6) comprises a plurality of inverters 264, 265, and 266 and a plurality of NAND gates 267, 268, 269 and 270.

As shown in FIG. 6, contact A of channel switch 242 is connected by a conductor 271 to the output of NAND gate 246. Contacts B and C of the channel switch are connected by conductors 272 and 273 to the inputs of inverters 265 and 266, respectively. Contact D of the channel switch is unconnected. In addition, inverter 264 has its input connected to conductor 214. NAND gates 267 and 268 have first inputs connected to the outputs of NAND gates 250 and 252, respectively, by conductors 274 and 275. NAND gates 267 and 268 also have second inputs connected by a common conductor 276 to the outputs of NAND gates 269 and 270. The outputs of NAND gates 269 and 270 are connected by a conductor 278 to reset terminals of flip-flops 238 and 240.

The outputs of inverters 266 and NAND gate 268 are connected to first and second inputs of NAND gate 269. Similarly, the outputs of inverter 265 and NAND gate 267 are connected to first and second inputs of NAND gate 270. Finally, the output of inverter 264 is connected by a conductor 280 to third input terminals of NAND gates 269 and 270.

As shown in FIG. 1, counting circuit 216 responds to output pulses from signal detector 194 applied to the counting circuit by a conductor 282. Referring to FIG. 6, conductor 282 is connected to reset terminals of binary counter 237, i.e., flip-flops 238 and 240, by common conductor 278. The pulses produced by the signal detector and applied to conductor 282 constitute reset pulses for the binary counter to reset flip-flops 238 and 240 to initial counting states.

In the operation of counting circuit 216 of the multiplex system, binary counter 237 (FIG. 6) operates in its normal divide-by-four configuration when channel switch 242 is set to contact D to provide for the multiplexing of video signals from the four video channels (A, B, C and D). When channel switch 242 is set to contact C, the binary counter is operated in a divide-by-three configuration to provide for multiplexing of video signals from three video channels (A, B and C). Similary, binary counter 237 operates in a divide-by-two configuration when the channel switch is set to contact B and the system is used to multiplex video signals from two video channels (A and B). Finally, when the system is to be operated with a single video channel (A), channel switch 232 is set to contact A to circumvent the operation of the binary counter.

Considering the operation of counting circuit 216 in more detail, when the multiplex system is used to record and reproduce signals from four video channels (A, B, C and D), channel switch 242 (FIG. 6) is set to contact D. Since contact D is not connected to gating circuitry 244, the ground potential applied to this contact has no effect on the operation of the gating circuitry or binary counter 237. Inverters 265 and 266 produce low voltage (binary 0) output signals which inhibit NAND gates 269 and 270. The NAND gates thus produce high voltage (binary 1) output signals which are applied by common conductor 278 to the reset terminals of flip-flops 238 and 240. The high voltage (binary 1) signals applied to the reset terminals have no effect on the counting operation of the binary counter, i.e., flip-flops 238 and 240. Thus, binary counter 237 operates in its normal divide-by-four configuration to sequentially actuate NAND gates 246, 248, 250 and 252 which operate multiplex switch 60 (FIGS. 1 and 2) to connect video channels A, B, C and D in sequence to video recorder 20.

In operating the multiplex system with only three video channels (A, B and C), channel switch 242 (FIG. 6) is set to contact C to apply a ground potential to the input of inverter 266. As a result, the inverter produces a high voltage (binary 1) output signal which is applied to the first input of NAND gate 269 to enable the NAND gate to respond to binary 1 signals applied to its remaining inputs from inverter 264 and NAND gate 268. Binary counter 237 is operated in its normal counting sequence by pulses 236 appearing on conductor 214 to actuate NAND gates 246, 248 and 250 in sequence to apply video signals from video channels A, B and C through multiplex switch 60 (FIGS. 1 and 2) to the video recorder. When flip-flops 238 and 240 of the binary counter are driven by the next pulse 236 to the counting states for actuating NAND gate 252, the NAND gate produces a low voltage (binary 0) output signal which is applied by conductor 275 to NAND gate 268. This binary 0 signal changes the output of NAND gate 268 from a binary 0 to a binary 1 signal which is applied to the second input of NAND gate 269. Since inverter 264 applies a binary 1 signal to the third input of NAND gate 269 for the duration of pulses 236, the output of NAND gate 269 is changed from a binary 1 to a binary 0 signal. This binary 0 signal is applied to the reset terminals of flip-flops 238 and 240 to reset binary counter 237 to its initial counting states to actuate NAND gate 246. At the same time, NAND gate 252 is immediately returned to its unactuated state. Thus, with channel switch 242 set to contact C, the operation of counting circuit 216 is modified to actuate only NAND gates 246, 248 and 250 in sequence.

When it is desired to operate the multiplex system with only two video channels (A and B), channel switch 242 is set to contact B to apply a ground potential to inverter 265. As a result, the inverter produces a high voltage (binary 1) output signal which is applied to the first input of NAND gate 270 to enable the NAND gate to respond to binary 1 signals applied to its remaining inputs from inverter 264 and NAND gate 267. Binary counter 237 is operated in its normal counting sequence by pulses 236 appearing on conductor 214 to actuate NAND gates 246 and 248 in sequence to apply video signals from video channels A and B through multiplex switch 60 (FIGS. 1 and 2) to the video recorder. When flip-flops 238 and 240 of the binary counter are driven by the next pulse 236 to the counting states for actuating NAND gate 250, the NAND gate produces a low voltage (binary 0) output signal which is applied by conductor 274 to NAND gate 267. This binary 0 signal changes the output of NAND gate 267 from a binary 0 to a binary 1 signal which is applied to the second input of NAND gate 270. Since inverter 264 applies a binary 1 signal to the third input of NAND gate 270 for the duration of pulse 236, the output of NAND gate 270 is changed from a binary 1 to a binary 0 signal. This binary 0 signal is applied to the reset terminals of flip-flops 238 and 240 to reset the binary counter to its initial counting states to actuate NAND gate 246. At the same time, NAND gate 250 is immediately returned to its unactuated state. Thus, with channel switch 242 set to contact B, the operation of counting circuit 216 is modified to actuate only NAND gates 246 and 248 in sequence.

Finally, when it is desired to operate the video multiplex system with a single video channel, e.g., channel A, channel switch 242 is set to contact A to provide a ground potential at the output of NAND gate 246 via conductor 271. The ground potential constitutes a binary 0 signal which is applied directly to inverters 256 and 257. Inverter 256 produces a high voltage (binary 1) output signal on conductor 122 to operate multiplex switch 60 to permit video signals from channel A to be recorded by video recorder 20. Similarly, inverter 257 produces a high voltage (binary 1) output signal on conductor 162 to operate demultiplex switch 70. Thus, with channel switch 242 set to contact A, counting circuit 216 operates in the same manner as if NAND gate 246 were continuously actuated by binary counter 237, and the operation of the binary counter is effectively circumvented.

As shown in FIGS. 1 and 6, the system of the preferred embodiment includes a record channel switch 284 for selectively connecting five (5) switch contacts (designated A, B, C, D and ALL) to ground. Referring to FIG. 6, contact A of record channel switch 284 is connected by a conductor 286 to the inputs of inverters 256 and 257. Similarly, a conductor 288 connects contact B of the record channel switch to inverters 258 and 259, a conductor 290 connects contact C to the inputs of inverters 260 and 261, and a conductor 292 connects contact D to the inputs of inverters 262 and 263.

In addition, conductor 286 connects contact A of record channel switch 284 and the output of NAND gate 246 to the input of an inverter 294. The output of the inverter is connected to conductor 182 to apply control signals to signal generator 170 (FIGS. 1 and 3).

As shown in FIG. 6, the contact of record channel switch 284 designated ALL is connected by a conductor 296 to the inputs of a pair of inverters 298 and 300. The output of inverter 298 is connected by a conductor 302 to an additional input of NAND gate 246. The output of inverter 300 is connected by conductor 278 to reset terminals of binary counter 237, i.e., flip-flops 238 and 240.

The purpose of record channel switch 284 and inverters 298 and 300 is to provide for selective operation of the system to record video signals from a plurality of video channels or from a particular video channel. When, for example, the record channel switch is set to the contact designated ALL, a ground potential is applied to inverters 298 and 300, and both inverters produce high voltage (binary 1) output signals. The binary 1 output signal of inverter 300 is applied to the reset terminals of flip-flops 238 and 240 of the binary counter. It has no effect on the counting operation of binary counter 237, and the binary counter is thus operated in a counting sequence determined by the setting of channel switch 242. The binary 1 output signal produced by inverter 298 is applied by conductor 302 to NAND gate 246 to permit the NAND gate to be operated in normal sequence by binary counter 237. When NAND gate 246 is actuated, its output changes from a binary 1 to a binary 0 signal which is inverted by inverter 294 to produce binary 1 output pulse 180 (FIGS. 3 and 5) to actuate signal generator 170.

When, however, record channel switch 284 (FIG. 6) is set to contact A, a ground potential (binary 0) is directly applied to inverters 256 and 257 on conductor 286, and both inverters produce high voltage (binary 1) signals. At the same time, inverters 298 and 300 produce low voltage (binary 0) output signals. The binary 0 output of inverter 298 is applied by conductor 302 to NAND gate 246 to inhibit the NAND gate from responding to signals applied to either of its remaining inputs, and the binary 0 output of inverter 300 is applied to the reset terminals of flip-flops 238 and 240 to hold the binary counter in its initial counting states. In response to the ground potential (binary 0) on conductor 286, inverter 294 continuously produces a binary 1 output signal to actuate signal generator 170 (FIG. 3). The signal generator produces a continuous 4 KHZ square wave until the ground potential is removed from conductor 236 by changing the position of record channel switch 284.

The binary 1 output signal produced by inverter 256 (FIG. 6) is applied to conductor 122 to turn on transistor 112 (FIG. 2) and operate field effect transistor 92 to permit video signals from channel A to appear at output terminal 69 of demultiplex switch 60 and to be applied to video input 42 of recorder 20. Simultaneously, the positive output signal produced by inverter 257 (FIG. 6) is applied to conductor 162 to turn on transistor 152 (FIG. 2) and operate field effect transistor 132 to permit video signals applied to input terminal 71 of demultiplex switch 70 to appear at output terminal 72.

Similarly, when record channel switch 284 is set to contacts B, C or D, binary counter 237 is held in its initial counting states, and NAND gate 246 is inhibited by the binary 0 signal on conductor 302. With NAND gate 246 inhibited, NAND gate 294 produces a binary 0 signal continuously on conductor 182 to prevent operation of signal generator 170. In addition, with the record channel switch set to contact B, inverters 258 and 259 operate corresponding transistor 124 and 154 in the multiplex and demultiplex switches to provide for recording and reproducing of video signals from channel B. Similarly, with the record channel switch set to contact C, inverters 260 and 261 operate corresponding transistors 126 and 156 in the multiplex and demultiplex switches to provide for recording and reproducing of video signals from channel C, and with the record channel switch set to contact D, inverters 262 and 263 operate corresponding transistors 128 and 158 in the multiplex and demultiplex switches to provide for recording and reproducing signals from channel D.

The system of the preferred embodiment also includes switching means for connecting the pulse generator to the selected video camera and the synchronizing signal detector to the signal generator during recording of video signals by the recorder and for connecting the pulse generator to the video output of the recorder and the detector to the audio output during play-back of the recorded video signals on the video monitors. In the preferred embodiment, the system further includes switching means for connecting the demultiplex switch to the video input of the recorder during recording of video signals and to the video output of the recorder during play-back of the recorded video signals on the video monitors.

Referring to FIG. 1, the switching means of the preferred embodiment comprises a plurality of two-position switches 306, 308 and 310. As indicated by phantom line 311, the switches are simultaneously operable between "record" and "play-back" positions.

Switch 306 includes a first contact 312 connected by a conductor 314 to output line 52 of video camera 22 and input terminal 62 of multiplex switch 60, a second contact 316 connected to video output 46 of recorder 20, and a third, movable contact 318 for engaging first contact 312 in its record position and second contact 316 in its play-back position. Movable contact 318 is connected by a conductor 320 (FIGS. 1 and 5) to pulse generator 212.

Similarly, switch 308 includes a first contact 322 connected by conductor 188 to signal generator 170, a second contact 324 connected to audio output 48 of recorder 20, and a third, movable contact 326 for engaging contact 322 in its record position and contact 324 in its play-back position. Movable contact 326 is connected by a conductor 328 (FIGS. 1 and 4) to synchronizing signal detector 194.

Finally, switch 310 includes a first contact 332 connected by a conductor 334 to video input 42 of recorder 20 and output terminal 69 of multiplex switch 60, a second contact 336 connected to video output 46 of the recorder, and a third, movable contact 338 for engaging contact 332 in its record position and contact 336 in its play-back position. Movable contact 338 is connected by conductor 80 to output terminal 71 of demultiplex switch 70.

Referring to FIG. 1, the multiplex system includes a direct-multiplex monitor switch 340. Video monitors 32, 34, 36, 38 and 40 are connected by a plurality of conductors 342, 344, 346, 348 and 350 to movable contacts 352, 354, 356, 358 and 360, respectively, of the direct-multiplex monitor switch. This switch includes four pairs of stationary contacts corresponding to movable contacts 352, 354, 356 and 358 for selectively connecting video monitors 32, 34, 36 and 38 directly to output lines 52, 54, 56 and 58 of the video cameras (channels A, B, C and D), respectively, or to output terminals 72, 74, 76 and 78, respectively, of demultiplex switch 70 via conductors 82, 84, 86 and 88. Movable contacts 352, 354, 356, 358 and 360 are operable simultaneously as indicated by phantom line 362 (FIG. 1).

In addition, a monitor selector switch 364 including a first, movable contact 366 for selectively engaging stationary contacts A, B, C and D and a second, movable contact 368 for selectively engaging stationary contacts A', B', C' and D' is provided. As indicated by phantom line 370 in FIG. 1, movable contacts 366 and 368 operate simultaneously. Contacts A, B, C and D of monitor selector switch 364 are connected by conductors 372, 374, 376 and 378 to output lines 52, 54, 56 and 58 (channels A, B, C and D), respectively. Similary, contacts A', B', C' and D' of the monitor selective switch are connected by conductors 82, 84, 86 and 88 to output terminals 72, 74, 76 and 78, respectively, of demultiplex switch 70.

As shown in FIG. 6, movable contacts 366 and 368 of the monitor selector switch are connected to a fifth pair of stationary contacts 380 and 382, respectively, associated with movable contact 360 of direct-multiplex monitor switch 362. When movable contact 360 engages contact 380, video signals from a selected video channel determined by the position of movable contact 366 of monitor selector switch 364 are applied by conductor 350 to video monitor 40. On the other hand, when movable contact 360 engages contact 382, video signals from a selected output of demultiplex switch 70 determined by the position of movable contact 368 are applied by conductor 352 to video monitor 40.

Referring to FIG. 1, multiplex switch 60, demultiplex switch 70, signal generator 170, synchronizing signal detector 190, pulse generator 212, and counting circuit 216 of the multiplex system can be designed as an integral unit including a front panel 386 with controls for operating record channel switch 284, record/play-back switches 306, 308, and 310, direct-multiplex monitor switch 340, and monitor selector switch 364, and a rear panel 388 with conventional input and output connectors, e.g., electrical jacks, for connection to video tape recorder 20, video cameras 22, 24, 26 and 28, and video monitors 32, 34, 36, 38 and 40, and a control for operating channel switch 242. The input and output connectors of rear panel 388 comprise a vertical sync input for receiving vertical synchronizing signals from recorder 20, four sync outputs for applying the vertical synchronizing signals to video cameras 22, 24, 26 and 28, four video inputs for receiving video signals from the video cameras, video and audio inputs and video and audio outputs for connection to recorder 20, and five video outputs for connection to video monitors 32, 34, 36, 38 and 40.

OPERATION

In the operation of the video multiplex system for recording video signals by recorder 20, switches 306, 308 and 310 (FIG. 1) are set to their record positions. As shown in FIG. 1, movable contact 318 of switch 306 is thus connected to fixed contact 312 to connect pulse generator 212 via conductor 314 to input terminal 62 of multiplex switch 60 and to output line 52 of video camera 22. Similarly, movable contact 326 of switch 308 engages fixed contact 322 to connect signal generator 170 to synchronizing signal detector 194. Finally, movable contact 338 of switch 310 engages fixed contact 332 to connect input terminal 71 of demultiplex switch 70 via conductor 334 to output terminal 69 of multiplex switch 60 and to video input 42 of the recorder. In addition, channel switch 242 is set to one of its contacts A, B, C or D, depending on the number of video channels to be operated.

Referring to FIGS. 1 and 6, channel switch 242 is set to contact D when the system is to be used to multiplex video signals from all four video channels, i.e., video cameras 22, 24, 26 and 28. With the channel switch set to contact D, binary counter 237 (FIG. 6), i.e., flip-flops 238 and 240, operates in its normal divide-by-four configuration in response to negative pulses 236 derived from pulse generator 212 (FIGS. 1 and 5). Pulse generator 212 responds to vertical blanking signals from video camera 22 applied to the pulse generator via conductor 314, switch 306, and conductor 320. The pulse generator produces output pulses 236 during the vertical blanking periods of the video signals from camera 22 to operate counting circuit 216 during the vertical blanking periods of the video signals.

As explained above, NAND gates 246, 248, 250 and 252 of counting circuit 216 (FIG. 6) are operated in sequence by binary counter 237 to sequentially produce binary 1 output signals on conductors 122, 124, 126 and 128, respectively, to turn on corresponding transistors 112, 114, 116 and 118 of multiplex switch 60 (FIG. 2). The sequential operation of transistors 112, 114, 116 and 118, gates field effect transistors 92, 94, 96 and 98 in sequence to permit video signals applied to input terminals 62, 64, 66 and 68 of the multiplex switch to appear at output terminal 69 for application to video input 42 of recorder 20. As shown in FIG. 7, the video signals from channels A, B, C and D are thus sequentially recorded on the video track of a video tape 390 of the recorder.

Referring to FIG. 6, during the actuation of NAND gate 246, inverter 294 applies a binary 1 signal (waveform 180) to conductor 182 to actuate signal generator 170 (FIG. 3) to produce an output signal in the form of a burst of 4 KHZ square waves (waveform 193) having a duration of 5 micro-seconds. This output signal of signal generator 170 is applied by conductor 188 to audio input 44 of recorder 20, and the 4 KHZ signal is thus recorded on the audio track of tape 390 (FIG. 7) during the time that video signals from channel A are applied to the recorder by multiplex switch 60. Simultaneously, the 4 KHZ output signal of signal generator 170 is applied via conductor 188, switch 308, and conductor 328 to signal detector 194 (FIG. 1). As explained above, signal detector 194 produces a negative output pulse (waveform 211) on conductor 282 after a predetermined time delay.

Referring to FIG. 6, the negative output pulse (waveform 211) produced by the signal detector is applied by conductors 282 and 278 to the reset terminals of flip-flops 238 and 240 of binary counter 237. In the normal operation of the binary counter, the reset pulses applied to flip-flops 238 and 240 have no effect on the counting states appearing in the flip-flops because the binary counter is already driven to its initial (reset) counting states as a result of the operation of pulse generator 212 by vertical blanking signals on conductor 214 to connect channel A through multiplex switch 60 to the video recorder. Binary counter 237 thereafter operates in its predetermined counting sequence to actuate NAND gates 248, 250 and 252 in sequence to connect video channels B, C and D, respectively, to video recorder 20 through the multiplex switch.

As shown in FIG. 7, video signals from channels A, B, C and D are sequentially recorded by the recorder on the video track of video tape 390. The 4 KHZ signals generated by the signal generator are , recorded on the audio track of video tape 390 during the same time as recording of video signals from channel A. The 4 KHZ signals recorded on the audio track thus constitute synchronizing signals for identifying the locations of the video signals recorded from channel A on video track of the tape.

During the recording of video signals from video channels A, B, C and D, input terminal 71 of demultiplex switch 70 is connected by conductor 80, switch 338, and conductor 334 (FIG. 1) to both output terminal 69 of the multiplex switch and video input 42 of the recorder. Referring to FIG. 6, the sequential operation of NAND gates 246, 248, 250 and 252 by the binary counting circuit results in the appearance of binary 1 output signals on conductors 162, 164, 166 and 168, respectively. These binary 1 signals operate corresponding transistors 152, 154, 156 and 158 of demultiplex switch 70 (FIG. 2) to gate field effect transistors 132, 134, 136 and 138 in sequence to permit the signals recorded from channels A, B, C and D to appear at output terminals 72, 74, 76 and 78, respectively, of the demultiplex switch.

Referring to FIG. 1, direct-multiplex monitor switch 362 can be selectively operated to apply the video signals from channels A, B, C and D directly to video monitors 32, 34, 36 and 38, respectively, or to apply the video signals appearing at output terminals 72, 74, 76 and 78 of demultiplex switch 70 to the corresponding video monitors.

During play-back of video signals from recorder 20, switches 306, 308 and 310 of the system are set to their play-back positions. Referring to FIG. 1, movable contact 318 of switch 306 is thus connected to fixed contact 316 to connect pulse generator 212 to video output 46 of recorder 20. Similarly, movable contact 326 of switch 308 engages fixed contact 324 to connect synchronizing signal detector 194 to audio output 48 of the recorder. Finally, movable contact 338 of switch 310 engages fixed contact 338 to connect input terminal 71 of demultiplex switch 70 to video output 46 of the recorder.

In play-back operation, recorder 20 produces a video output signal at its video output 46 comprising, in sequence, video signals from channels A, B, C and D. In addition, a burst of 4 KHZ square waves periodically appears at audio output 48 of the recorder during the occurrence of video signals from channel A at video output 46.

Referring to FIG. 1, pulse generator 212 is operated by video signals from video output 46 of recorder 20 during play-back operation of the system. Pulse generator 212 thus responds to vertical blanking signals appearing at video output 46 to produce negative output pulses 236 (FIG. 5) on conductor 214 for operating binary counter 237 to actuate NAND gates 246, 248, 250 and 252 (FIG. 6) in sequence.

The 4 KHZ output signal from audio output 48 of recorder 20 is detected by signal detector 194 (FIG. 4) which produces a negative output pulse (waveform 211) on conductor 282. Referring to FIG. 6, the negative pulse (waveform 211) on conductor 282 is applied by conductor 278 to the reset terminals of binary counter 237, i.e., flip-flops 238 and 240, to reset the binary counter to its initial (reset) counting states during the appearance of recorded video signals from channel A at the video output of the recorder. As a result, NAND gate 246 is actuated to operate inverter 257 to produce a binary 1 output signal on conductor 162. Referring to FIG. 2, the binary 1 signal on conductor 162 turns on transistor 152 to gate field effect transistor 132 to permit the recorded video signals from channel A applied to input terminal 71 of multiplex switch 70 through switch 310 to appear at output terminal 72. With direct-multiplex monitor switch 340 set to its multiplex position, the video signals appearing at output terminal 72 of the demultiplex switch are applied via conductor 82, movable contact 352, and conductor 342 to video monitor 32.

In subsequent operation of binary counter 237 (FIG. 6) by pulses 236 from the pulse generator, NAND gates 248, 250 and 252 are operated in sequence to actuate inverters 259, 261 and 263 to apply binary 1 output signals to conductors 164, 166 and 168. Referring to FIG. 2, the binary 1 signals on conductors 164, 166 and 168 turn on transistors 154, 156 and 158, in sequence, to gate corresponding field effect transistors 134, 136 and 138 to permit recorded video signals from channels from B, C, and D to appear at output terminals 74, 76 and 78, respectively, of multiplex switch 70. Referring to FIG. 1, with direct-multiplex monitor switch 340 set to its multiplex position, the video signals from output terminals 74, 76 and 78 of the demultiplex switch are applied via corresponding contacts 354, 356 and 358 of the direct-multiplex monitor switch and conductors 344, 346 and 348, respectively, to corresponding video monitors 34, 36 and 38.

The 4 KHZ output signal appearing at audio output 46 of recorder 20 functions as a synchronizing signal for operating signal detector 194 to reset binary counter 237 to its initial counting states in the event that the operation of the binary counter is out of synchronism with the video signals recorded on the video tape. When binary counter 237 is synchronized with the recorded video signals, however, the appearance of a reset pulse from the synchronizing signal detector on conductor 282 has no effect on the operating sequence of the binary counter.

When the multiplex system is to be operated with less than four video channels, channel switch 242 is set to the appropriate contact A, B or C to control the operation of counting circuit 216 to accommodate the desired number of channels, as previously described. The operation of multiplex switch 60, demultiplex switch 70, and counting circuit 216 is similar to the operation described above, except that video signals from only the desired number of video channels are multiplexed by the system.

Although the specification describes a preferred embodiment of the multiplex system for use with four video channels, the present invention is not limited to a multiplex system for use with a particular number of video channels and, thus, the system can be modified to operate with a different number of video channels without departing from the principles of the invention. For example, it would be possible to multiplex only one-half of the field of the video channels to double the channel multiplexing capability of the system. In addition, the present invention is not limited to systems in which synchronizing signals are recorded on the audio track of a video tape and, thus, it would be possible to record synchronizing signals on the video track in practicing the principles of this invention.

The invention in its broader aspects is not limited to the specific details shown and described, and modifications may be made in the details of the multiplex system without departing from the principles of the present invention.

What is claimed is:

1. A video multiplex system for recording and reproducing video signals, which comprises:

a video tape recorder having video and audio inputs and video and audio outputs;

a plurality of video cameras;

a plurality of video monitors;

a multiplex switch for sequentially connecting said video cameras to said video input of said video tape recorder;

a demultiplex switch for sequentially connecting said video monitors to said video output of said video tape recorder;

a signal generator for applying a synchronizing signal to said audio input of said video tape recorder during the coupling of a selected video camera to said video input;

a pulse generator responsive to vertical blanking signals from at least one of the video cameras during recording of the video signals and responsive to said video output of said recorder during play-back of recorded video signals for producing pulses during the vertical blanking periods of the video signals;

a counting circuit responsive to the pulses for simultaneously operating said multiplex and demultiplex switches and for actuating said signal generator to apply a synchronizing signal to said audio input of said recorder during the coupling of the selected video camera to said video input;

a synchronizing signal detector responsive to said signal generator during recording of the video signals and responsive to said audio output of said recorder during play-back of the recorded video signals for applying the synchronizing signals to said counting circuit; and switching means for connecting said pulse generator to the selected video camera and said synchronizing signal detector to said signal generator during recording of video signals by said recorder and for connecting said pulse generator to said video output of said recorder and said detector to said audio output of said recorder during play-back of the recorded video signals on said video monitors.

2. The system of claim 1, which includes:

switching means for connecting said demultiplex switch to said video input of said recorder during recording of video signals and to said video output of said recorder during play-back of the recorded video signals on said video monitors.

3. The system of claim 1, wherein:

said multiplex switch comprises a plurality of switching elements connected in parallel, each switching element being connected to one of said video cameras and having a common output connected to said video input of said recorder;

said demultiplex comprises a second plurality of switching elements connected in parallel, each switching element being connected to one of said video monitors and having a common input responsive to said video output of said recorder; and said counting circuit includes a binary counter comprising a plurality of binary counting stages operable in a predetermined counting sequence and a plurality of control gates actuated by said binary counting stages for simultaneously operating said switching elements of said multiplex and demultiplex switches in sequence.

4. The system of claim 3, which includes:

means for selectively varying the counting sequence of said binary counting stages to adjust the system to record and reproduce video signals from a variable number of video cameras.

5. The system of claim 3, wherein:

said signal generator is responsive to one of said control gates in said counting circuit to produce said synchronizing signal when said control gate is actuated by the binary counting stages.

* * * * *